United States Patent
Zha

(10) Patent No.: US 10,605,494 B2
(45) Date of Patent: Mar. 31, 2020

(54) SYSTEM AND METHOD FOR REUSING WASTE HEAT OF A TRANSCRITICAL REFRIGERATION SYSTEM

(71) Applicant: Heatcraft Refrigeration Products LLC, Stone Mountain, GA (US)

(72) Inventor: Shitong Zha, Snellville, GA (US)

(73) Assignee: Heatcraft Refrigeration Product LLC, Stone Mountain, GA (US)

( * ) Notice: Subject to any disclaimer, the term of this patent is extended or adjusted under 35 U.S.C. 154(b) by 0 days.

(21) Appl. No.: 15/397,284

(22) Filed: Jan. 3, 2017

(65) Prior Publication Data

US 2018/0187928 A1    Jul. 5, 2018

(51) Int. Cl.
| | | |
|---|---|---|
| F25B 9/00 | (2006.01) | |
| F25B 30/02 | (2006.01) | |
| F25B 5/02 | (2006.01) | |
| F25B 9/10 | (2006.01) | |
| F25B 6/04 | (2006.01) | |

(Continued)

(52) U.S. Cl.
CPC ............... *F25B 9/008* (2013.01); *F24D 3/18* (2013.01); *F25B 5/02* (2013.01); *F25B 6/04* (2013.01); *F25B 9/10* (2013.01); *F25B 29/003* (2013.01); *F25B 30/02* (2013.01); *F24D 3/14* (2013.01); *F24D 17/001* (2013.01); *F24D 17/02* (2013.01); *F24D 2200/24* (2013.01); *F24D 2220/2081* (2013.01); *F25B 2309/06* (2013.01); *F25B 2309/061* (2013.01); *F25B 2339/047* (2013.01); *F25B 2341/0662* (2013.01); *F25B 2400/13* (2013.01); *F25B 2400/22* (2013.01);

(Continued)

(58) Field of Classification Search
CPC .. F25B 9/008; F25B 30/02; F25B 5/02; F25B 9/10; F25B 2400/22; F25B 2309/061; F25B 2309/06; F25B 2339/047; F24D 3/18
USPC .................................................... 62/79, 498
See application file for complete search history.

(56) References Cited

U.S. PATENT DOCUMENTS 6,279,333 B1 *  8/2001  Cilli ........................ F24F 1/04
                                                         62/237
6,862,894 B1    3/2005  Miles, Sr.
(Continued)

FOREIGN PATENT DOCUMENTS

EP        2407734 A1    1/2012
EP        2495510 A1    1/2012
(Continued)

OTHER PUBLICATIONS

Extended European Search Report in Application No. 17209835.2-1008, dated Jun. 1, 2018, 7 pages, received by Applicant Jul. 2, 2018, dated Jul. 2, 2018.

*Primary Examiner* — Frantz F Jules
*Assistant Examiner* — Lionel Nouketcha
(74) *Attorney, Agent, or Firm* — Baker Botts L.L.P.

(57) ABSTRACT

A method for a refrigeration system includes applying, by a gas cooler of the refrigeration system, a first cooling stage to refrigerant circulating through the refrigeration system load. The method further comprises applying, by a heat exchanger located downstream from the gas cooler, a second cooling stage to the refrigerant, wherein the second cooling stage removes heat from the refrigerant, and applying, by the heat exchanger located downstream from the gas cooler, the heat removed during the second cooling stage to a water heating system operable to heat water.

11 Claims, 4 Drawing Sheets

(51) Int. Cl.
*F25B 29/00* (2006.01)
*F24D 3/18* (2006.01)
*F24D 3/14* (2006.01)
*F24D 17/02* (2006.01)
*F24D 17/00* (2006.01)

(52) U.S. Cl.
CPC .............. *Y02B 30/12* (2013.01); *Y02B 30/18* (2013.01); *Y02B 30/24* (2013.01)

(56) References Cited

U.S. PATENT DOCUMENTS

| | | | |
|---|---|---|---|
| 8,640,475 B2* | 2/2014 | Park | F24D 19/1072 |
| | | | 62/238.7 |
| 2012/0000237 A1* | 1/2012 | Yamada | F25B 1/10 |
| | | | 62/324.6 |
| 2012/0011866 A1* | 1/2012 | Scarcella | F25B 1/10 |
| | | | 62/79 |
| 2012/0204596 A1* | 8/2012 | Takenaka | F25B 6/04 |
| | | | 62/510 |
| 2013/0306745 A1* | 11/2013 | Ohama | C02F 5/086 |
| | | | 236/12.1 |

FOREIGN PATENT DOCUMENTS

| | | |
|---|---|---|
| JP | S56141969 | 10/1981 |
| JP | 2013083439 | 3/2013 |

* cited by examiner

SYSTEM AND METHOD FOR REUSING WASTE HEAT OF A TRANSCRITICAL REFRIGERATION SYSTEM

TECHNICAL FIELD

This disclosure relates generally to waste heat of a transcritical refrigeration system. More specifically, this disclosure relates to a system and method of reusing waste heat of a transcritical refrigeration system.

BACKGROUND

During operation of a refrigeration system, components of a transcritical refrigeration system may discharge heat. The heat produced by the components is also referred to as "waste heat." In typical transcritical refrigeration systems, this waste heat is released into the environment because it is too hot to be reused.

SUMMARY OF THE DISCLOSURE

According to one embodiment, a refrigeration system is operable to circulate refrigerant through the refrigeration system in order to cool a refrigeration load and comprises a gas cooler and a heat exchanger located downstream the gas cooler. The gas cooler is operable to receive the refrigerant and apply a first cooling stage to the refrigerant. The heat exchanger is operable to receive the refrigerant cooled by the gas cooler, and apply a second cooling stage to the refrigerant, wherein the second cooling stage removing heat from the refrigerant. The heat exchanger is further operable to apply the heat removed during the second cooling stage to a water heating system operable to heat water and discharge the refrigerant to an expansion valve operable to supply the refrigerant to the refrigeration load.

According to another embodiment, a method for a refrigeration system includes applying, by a gas cooler of the refrigeration system, a first cooling stage to refrigerant circulating through the refrigeration system load. The method further comprises applying, by a heat exchanger located downstream from the gas cooler, a second cooling stage to the refrigerant, wherein the second cooling stage removes heat from the refrigerant, and applying, by the heat exchanger located downstream from the gas cooler, the heat removed during the second cooling stage to a water heating system operable to heat water.

According to yet another embodiment, a heat exchanger is operable to receive refrigerant cooled by a gas cooler of a refrigeration system and apply a cooling stage to the received refrigerant, wherein the cooling stage removes heat from the refrigerant. The heat exchanger is further operable to apply the heat removed during the cooling stage to a water heating system operable to heat water and discharge the cooled refrigerant to an expansion valve operable to supply the refrigerant to a refrigeration load of the refrigeration system.

Certain embodiments may provide one or more technical advantages. For example, an embodiment of the present disclosure may result in more efficient operation of refrigeration system. As another example, an embodiment of the present disclosure may provide supplemental cooling to refrigerant circulating through the refrigeration system. As yet another example, an embodiment of the present invention may provide heating to one or more additional facility systems such as a floor heating system and/or a water heating system. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
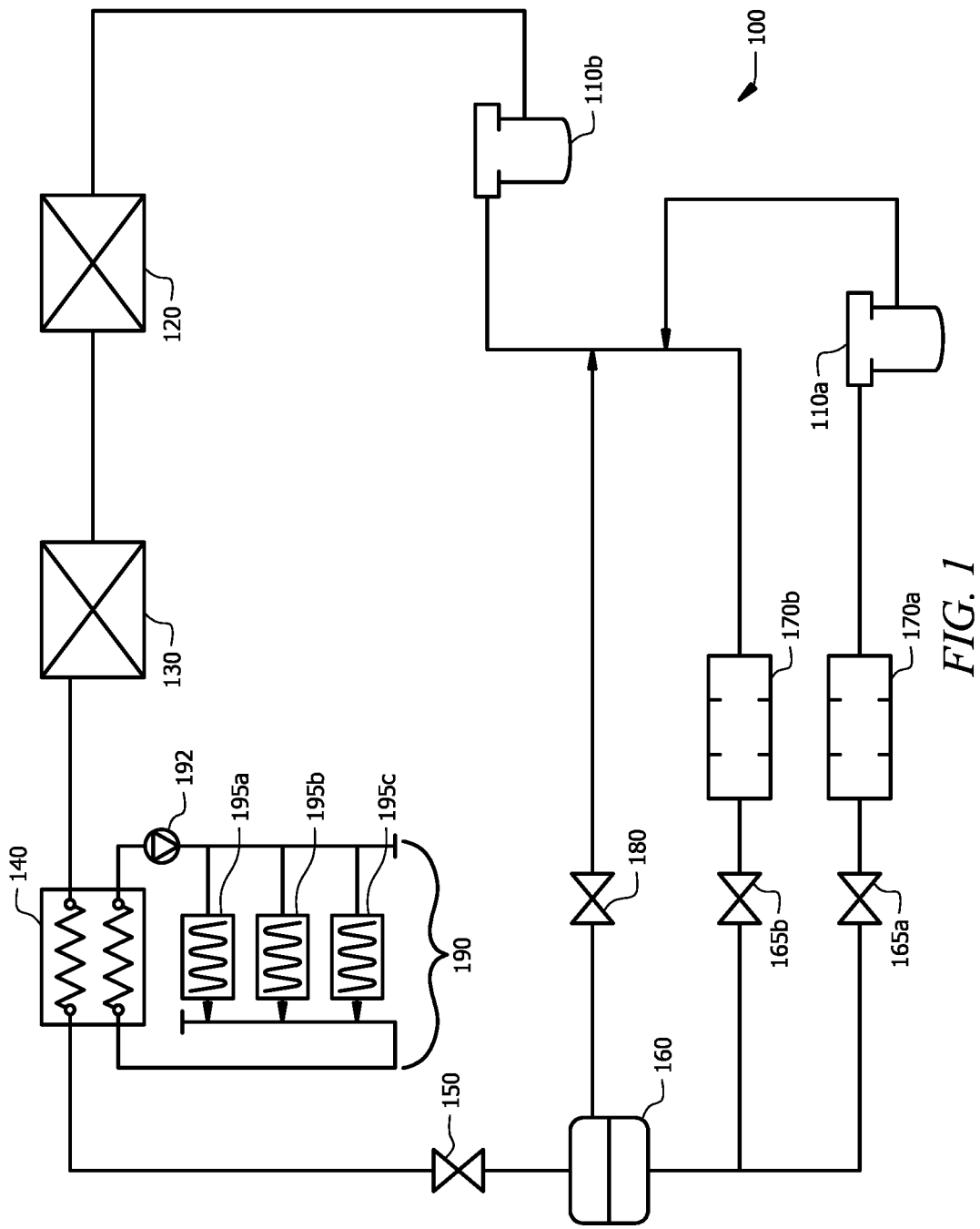
FIG. 1 illustrates an example refrigeration system operable to apply waste heat to a floor heating system, according to certain embodiments of the present disclosure.

Embodiments of the present disclosure and its advantages are best understood by referring to FIGS. 1 through 5 of the drawings, like numerals being used for like and corresponding parts of the various drawings.

Transcritical refrigeration systems differ from conventional refrigeration systems in that transcritical systems circulate refrigerant that becomes a supercritical fluid above the critical point. As an example, the critical point for carbon dioxide ($CO_2$) is 31° C. and 73.8 MPa, and above this point, $CO_2$ becomes a homogenous mixture of vapor and liquid that is called a supercritical fluid. This unique characteristic of transcritical refrigerants is associated with certain operational differences between transcritical and conventional refrigeration systems. For example, transcritical refrigerants are typically associated with discharge temperatures that are higher than their critical temperatures and discharge pressures that are higher than their critical pressures. When a transcritical refrigerant is at or above its critical temperature and/or pressure, the refrigerant may become a "supercritical fluid"—a homogenous mixture of gas and liquid. Supercritical fluid does not undergo two phase changes in a gas cooler as occurs in a condenser of a conventional refrigeration system circulating traditional refrigerant. Rather, supercritical fluid undergoes a single phase change in the gas cooler. Stated differently, the gas cooler in a transcritical refrigeration system receives and cools supercritical fluid and the transcritical refrigerant undergoes a partial state change from a liquid to a gas as it is discharged from an expansion valve.

In addition to a gas cooler, typical transcritical systems may include a heat exchanger located upstream of the gas cooler. Such heat exchanger may be configured to receive compressed refrigerant from one or more compressors and perform a cooling stage to the refrigerant before discharging the cooled refrigerant to the gas cooler. During operation of a typical transcritical refrigeration system, one or more components (e.g., gas cooler, heat exchangers) of the system will give off waste heat. However, the waste heat in typical transcritical systems is generally too hot to be reused by another system. For example, waste heat from a heat exchanger upstream of a gas cooler may be 110° C. The present disclosure contemplates a configuration of a refrigeration system that is operable to provide waste heat to other systems via a heat exchanger located downstream from the gas cooler. As one example, the present disclosure recognizes utilizing waste heat of a transcritical refrigeration system to heat the floor in a cold room (e.g., freezer). As another example, the present disclosure recognizes utilizing waste heat of a transcritical refrigeration system to pre-heat tap water. Utilizing waste heat in these and other manners may provide various efficiency benefits for the transcritical refrigeration system and the other systems that the heat is provided to.

Figure 3:
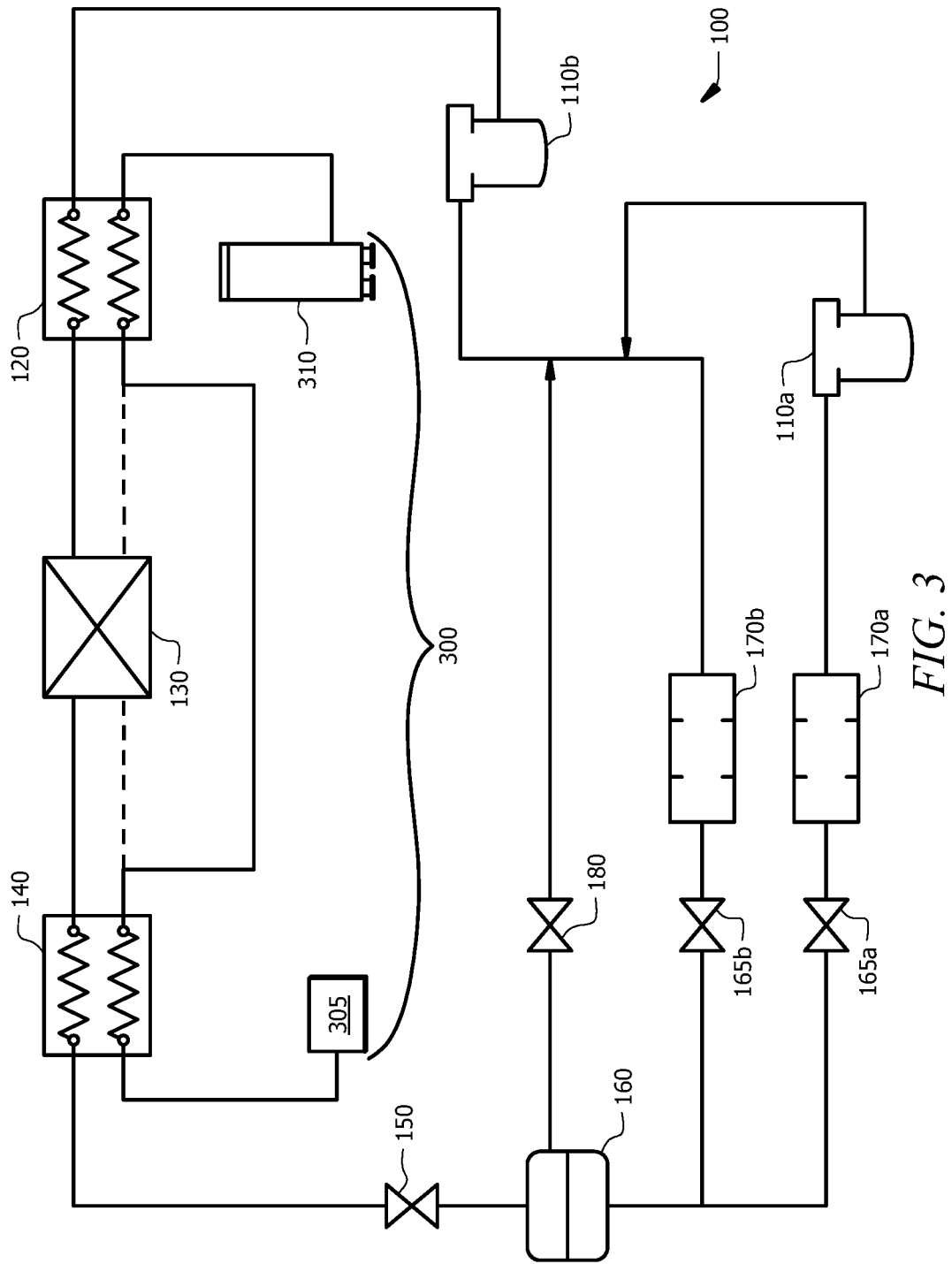
FIG. 3 illustrates an example refrigeration system operable to apply waste heat to a water heating system, according to certain embodiments of the present disclosure.

FIGS. 1 and 3 illustrate examples of refrigeration systems 100 operable to apply waste heat to other systems within a facility. Specifically, FIG. 1 illustrates an example of refrigeration system 100 operable to apply waste heat to a floor heating system 190 and FIG. 3 illustrates an example of a refrigeration system 100 operable to apply waste heat to a water heating system 300. In some embodiments, refrigeration system 100 is a transcritical refrigeration system that circulates a transcritical refrigerant such as $CO_2$. Refrigeration system 100 may include one or more compressors 110, one or more heat exchangers 120-140, an expansion valve 150, a flash tank 160, one or more valves 165 corresponding to one or more evaporators 170, and a flash tank valve 180. Generally, refrigeration system 100 is operable to provide cold liquid refrigerant to evaporators 170. The evaporators 170 discharge warm refrigerant vapor to compressors 110 which is then cooled by one or more heat exchangers 120-140 and discharged to expansion valve 150 prior to returning to evaporators 170. In some embodiments, heat exchanger 140, located downstream from gas cooler 130, may provide heating to other systems in addition to providing supplemental cooling to refrigerant circulating through refrigeration system 100. As depicted in FIG. 1, heat exchanger 140 is configured to provide heating to floor heating system 190. As depicted in FIG. 3, heat exchanger 140 is configured to provide heating to water heating system 300.

In some embodiments, refrigeration system 100 includes one or more compressors 110. Refrigeration system 100 may include any suitable number of compressors 110. For example, as depicted in FIGS. 1 and 3, refrigeration system 100 includes two compressors 110a-b. Compressors 110 may vary by design and/or by capacity. For example, some compressor designs may be more energy efficient than other compressor designs and some compressors 110 may have modular capacity (i.e., capability to vary capacity). In certain embodiments, compressor 110a may be a low-temperature ("LT") compressor that is configured to compress refrigerant discharged from a LT evaporator (e.g., evaporator 170a) and compressor 110b may be a medium-temperature ("MT") compressor that is configured to compress refrigerant discharged from a MT evaporator (e.g., MT evaporator 170b) and provide supplemental compression to refrigerant discharged from compressor 110a. Accordingly, compressors 110 may be operable to receive refrigerant discharged from evaporators 170 and compress the received refrigerant. In some embodiments, compressors 110 discharge compressed refrigerant directly to gas cooler 130. In other embodiments, refrigerant discharged from compressors 110 is directed to another component of refrigeration system 100. For example, as depicted in FIGS. 1 and 3, compressor 110b discharges compressed refrigerant to a first heat exchanger 120, which in turn discharges refrigerant to gas cooler 130.

Refrigeration system 100 may comprise a heat exchanger located upstream from gas cooler 130 in some embodiments. For example, as depicted in FIGS. 1 and 3, refrigeration system 100 includes first heat exchanger 120 that is upstream of gas cooler 130. In some embodiments, first heat exchanger 120 receives compressed refrigerant discharged from compressors 110 and provides a first cooling stage to the received refrigerant. As an example, first heat exchanger 120 may receive refrigerant having a temperature of 107° C. from compressors 110 and cool the refrigerant to a temperature of 95° C. before discharging the refrigerant to gas cooler 130. In some embodiments, operation of first heat exchanger 120 results in waste heat. As described above, waste heat from first heat exchanger 120 may be too hot to be used by other systems. For example, waste heat from first heat exchanger 120 may be 90° C. and therefore may be referred to as "high-grade heat." In some embodiments, after applying a first cooling stage to the refrigerant, first heat exchanger 120 discharges the cooled refrigerant to gas cooler 130 for additional cooling.

As described above, refrigeration system 100 may include a gas cooler 130 in some embodiments. Gas cooler 130 may be operable to receive refrigerant (e.g., from heat exchanger 120 and/or compressors 110) and apply a cooling stage to the received refrigerant. In some embodiments, gas cooler 130 may cool refrigerant between 50-80° C. In some embodiments, gas cooler 130 is a heat exchanger comprising cooler tubes configured to circulate the received refrigerant and coils through which ambient air is forced. Inside gas cooler 130, the coils may absorb heat from the refrigerant, thereby providing cooling to the refrigerant. In some embodiments, gas cooler receives refrigerant having a temperature of 90° C. from first heat exchanger 120 and discharges the refrigerant at a temperature of 38° C. to second heat exchanger 140.

Refrigeration system 100 also includes a second heat exchanger 140 in some embodiments. As described above, second heat exchanger 140 may be configured to receive cooled refrigerant from gas cooler 130 and apply a cooling stage to the refrigerant. As an example, second heat exchanger 140 may cool the refrigerant between 3-7° C. In some embodiments, operation of second heat exchanger 140 results in waste heat. Waste heat from second heat exchanger 140 may have a temperature that is just above the ambient temperature (e.g., 5° R/2° K above the outdoor air temperature), and therefore may be referred to herein as "low-grade heat." This low-grade heat from second heat exchanger 140 may be reclaimed and used to heat one or more other systems. As described above, waste heat of second heat exchanger 140 may be reclaimed and provided to ground heating system 190 of FIG. 1 and/or water heating system 300 of FIG. 3. As a result, second heat exchanger 140 may provide supplemental cooling to refrigerant circulating through refrigeration system and provide heating to systems capable of utilizing low-grade heat. Operation of the cooperating systems will be described in more detail below. In some embodiments, second heat exchanger 140 discharges the refrigerant to expansion valve 150 after applying a cooling stage.

In some embodiments, refrigeration system 100 includes an expansion valve 150. Expansion valve 150 may be configured to receive liquid refrigerant from second heat exchanger 140 and to reduce the pressure of received refrigerant. For example, second heat exchanger 140 may discharge liquid refrigerant having a pressure of 100 bar to expansion valve 150, and the refrigerant may be discharged from expansion valve 150 having a pressure of 38 bar. In some embodiments, this reduction in pressure causes some of the refrigerant to vaporize. As a result, mixed-state refrigerant (e.g., refrigerant vapor and liquid refrigerant) is discharged from expansion valve 150. In some embodiments, this mixed-state refrigerant is discharged to flash tank 160.

Refrigeration system 100 may include a flash tank 150 in some embodiments. Flash tank 150 may be configured to receive mixed-state refrigerant and separate the received refrigerant into flash gas and liquid refrigerant. Typically, the flash gas collects near the top of flash tank 160 and the liquid refrigerant is collected in the bottom of flash tank 160. In some embodiments, the liquid refrigerant flows from flash tank 160 and provides cooling to one or more evaporators (cases) 170 and the flash gas flows to one or more compressors (e.g., compressor 110b) for compression before being discharged to gas cooler 130 for cooling.

Refrigeration system 100 may include one or more evaporators 170 in some embodiments. As depicted in FIGS. 1 and 3, refrigeration system 100 includes two evaporators 170. In some embodiments, evaporators 170 are refrigerated cases and/or coolers for storing food and/or beverages that must be kept at particular temperatures. As depicted in FIGS. 1 and 3, first evaporator 170a is a low-temperature case ("LT" case 170a) and second evaporator 170b is a medium-temperature case ("MT case" 170b). LT case 170a may be configured to receive liquid refrigerant of a first temperature and MT case 160b may be configured to receive liquid refrigerant of a second temperature, wherein the first temperature (e.g., −30° C.) is lower in temperature than the second temperature (e.g., −6° C.). As an example, LT case 170a may be a display case in a grocery store and MT case 170b may be a cooler in a grocery store. In some embodiments, the liquid refrigerant leaving flash tank 160 is the same temperature and pressure (e.g., 4° C. and 38 bar). Before reaching cases 170, the liquid refrigerant may be directed through one or more evaporator valves 165 (e.g., 165a and 165b of FIGS. 1 and 3). In some embodiments, each valve 165 may be controlled (e.g., by controller 500 of FIG. 5) to adjust the temperature and pressure of the liquid refrigerant. For example, valve 165a may be configured to discharge the liquid refrigerant at −30° C. and 14 bar to LT case 170a and valve 165b may be configured to discharge the liquid refrigerant at −6° C. and 30 bar to MT case 170b. In some embodiments, each evaporator 170 is associated with a particular valve 165 and the valve 165 controls the temperature and pressure of the liquid refrigerant that reaches the evaporator 170.

Figure 2:
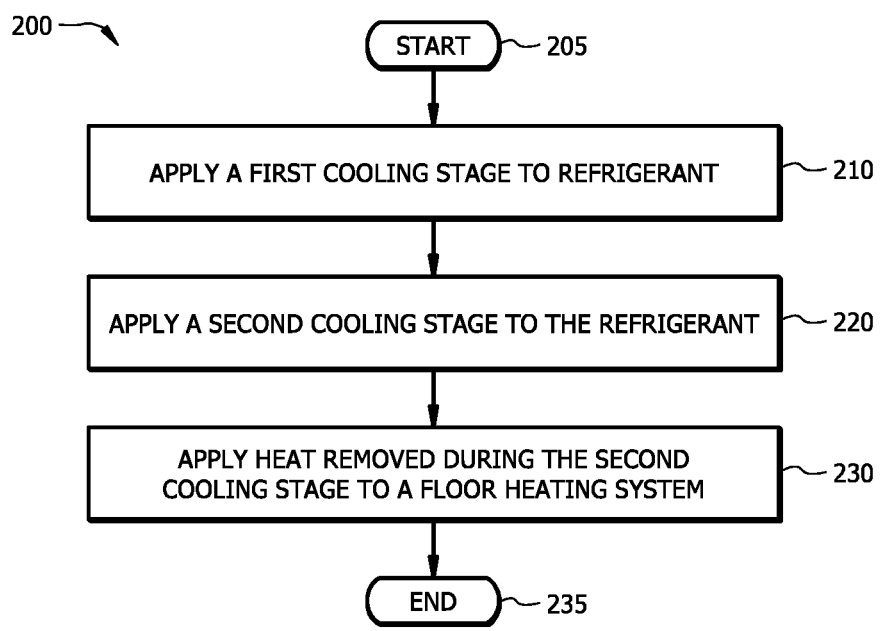
FIG. 2 is a flow chart illustrating a method of operation for the example refrigeration system of FIG. 1.

System 100 may also include a flash gas valve 180 in some embodiments. Flash gas valve 180 may be configured to open and close to permit or restrict the flow through of flash gas discharged from flash tank 160. In some embodiments, controller 500 of FIG. 5 controls the opening and closing of flash gas valve 180. As depicted in FIGS. 1 and 2, closing flash gas valve 180 may restrict flash gas from flowing to second compressor 110b and opening flash gas valve 180 may permit flow of flash gas to second compressor 110b.

Although this disclosure describes and depicts refrigeration system 100 including certain components, this disclosure recognizes that refrigeration system 100 may include any suitable components. As an example, refrigeration system 100 may include one or more sensors configured to detect temperature and/or pressure information. In some embodiments, each of compressors 110, heat exchangers 120, 140, gas cooler 130, flash tank 160, and evaporators 170 include one or more sensors. As another example, refrigeration system 100 may include a controller operable to communicate with one or more components of refrigeration system 100. An example of a controller of refrigeration system 100 will be explained in further detail below in reference to FIG. 5. As yet another example, refrigeration system 100 may include an oil separator operable to separate compressor oil from the refrigerant. One of ordinary skill in the art will appreciate that refrigeration system 100 may include other components not mentioned herein.

As described above, FIG. 1 illustrates refrigeration system 100 operating in cooperation with floor heating system 190. Floor heating system 190 may be operable to circulate a second refrigerant and may comprise a pump 192 and one or more coils 195. As depicted in FIG. 1, floor heating system, 190 comprises three coils 195a-c. Coils 195 may be underground floor coils operable to heat the floor of an enclosed space. As an example and not by way of limitation, coils 195 may heat the floor of a cold room (e.g., walk-in freezer). Heating the floor of a cold room may be desirable for one or more reasons. For example, it may be desirable to heat the floor of a cold room to protect the floor from freezing. Traditional solutions for heating the floor of a cold room include reclaiming heat from a refrigeration rack (e.g., compressors 110). However, as described above, this solution does not translate in a transcritical refrigeration system because the waste heat from the refrigeration rack is too hot (e.g., 95° C.) and using such waste heat directly would cause more problems than it would resolve.

In operation, pump 192 causes the second refrigerant to circulate throughout coils 195 and through second heat exchanger 140 thereafter. In some embodiments, the second refrigerant is a substance that can absorb heat as it passes through second heat exchanger 140. As an example, the second refrigerant may be a glycol solution (e.g., 30% glycol, 70% water). Heat exchanger 140 may heat the second refrigerant with low-grade waste heat as the second refrigerant passes through heat exchanger 140. In some embodiments, the second refrigerant is heated between 1-3° C. by absorbing low-grade waste heat. For example, pump 120 may receive second refrigerant at a temperature of 13° C. and force the second refrigerant through coils 195. As stated above, the warmed refrigerant provides heating to coils 195 which is transferred to the cold room floor. Stated differently, the second refrigerant cools down as the cold room floor heats up. As a result, second refrigerant exits coils 195 at a decreased temperature (e.g., 10° C.) and is directed to second heat exchanger 140 for a warming stage. In this manner, floor heating system 190 may reclaim low-grade waste heat of second heat exchanger 140 and reduce and/or remove operation of any heating element that would otherwise heat the cold room floor. Additionally, second heat exchanger 140 supplements cooling of the refrigerant circulating through refrigeration system 100 thereby reducing the power otherwise consumed by gas cooler 130.

FIG. 2 illustrates a method of operation for the refrigeration system configuration of FIG. 1. In some embodiments, the method 200 may be implemented by a controller of refrigeration system 100 (e.g., controller 500 of FIG. 5). Method 200 may be stored on a computer readable medium, such as a memory of controller 500 (e.g., memory 520 of FIG. 5), as a series of operating instructions that direct the operation of a processor (e.g., processor 530 of FIG. 5). Method 200 may be associated with efficiency benefits such as reduced power consumption relative to refrigeration systems that do not operate heat exchanger downstream from the gas cooler. In some embodiments, the method 200 begins in step 205 and continues to step 210.

At step 210, the refrigeration system applies a first cooling stage to refrigerant circulating through the refrigeration system. In some embodiments, the component that applies the first cooling stage is a gas cooler (e.g., gas cooler 130 of FIG. 1) of the refrigeration system. The refrigerant may be cooled between 10-30° K during the first cooling stage. As an example, gas cooler 130 may receive refrigerant having a temperature of 95° C., apply the first cooling stage to the received refrigerant, and discharge the refrigerant at a temperature of 40° C. In some embodiments, gas cooler 130 receives the refrigerant from first heat exchanger 120. In some embodiments, gas cooler 130 discharges the refrigerant to second heat exchanger 140. After applying the first cooling stage to the refrigerant, the method 200 may continue to a step 220.

At step 220, the refrigeration system applies a second cooling stage to refrigerant circulating through the refrigeration system. In some embodiments, the component that applies the second cooling stage is a heat exchanger (e.g., second heat exchanger 140 of FIG. 1) of the refrigeration system. In some embodiments, the heat exchanger that applies the second cooling stage is located downstream from the gas cooler (e.g., gas cooler 130) of the refrigeration system. In some embodiments, applying the second cooling stage comprises removing heat from the refrigerant. Stated differently, the second cooling stage may cause a reduction in the temperature of the refrigerant. In some embodiments, the refrigerant may be cooled between 2-5° C. during the second cooling stage. As an example, second heat exchanger 140 may receive refrigerant having a temperature of 38° C., apply the second cooling stage to the received refrigerant, and discharge the refrigerant at a temperature of 35° C. In some embodiments, second heat exchanger 140 receives the refrigerant from gas cooler 130. In some embodiments, second heat exchanger 140 discharges the refrigerant to expansion valve 150 to supply the refrigerant to a refrigeration load. After applying the second cooling stage to the refrigerant, the method 200 may continue to a step 230.

At step 230, the refrigeration system applies the heat removed during step 220 to a floor heating system (e.g., floor heating system 190 of FIG. 1). In some embodiments, the component of refrigeration system that applies the heat to the floor heating system is a heat exchanger (e.g., second heat exchanger 140 of FIG. 1). In some embodiments, the heat exchanger that applies the heat removed during step 220 is located downstream from a gas cooler (e.g., gas cooler 130) of the refrigeration system. In some embodiments, the refrigeration system applies the heat to a second refrigerant circulating through the floor heating system which is operable to heat the floor of an enclosed space. As an example, second heat exchanger 140 applies the heat removed from the refrigerant during step 220 to a second refrigerant which in turn heats the floor of an enclosed space (e.g., the floor of a cold room). In some embodiments, the second refrigerant is heated at least 2° C. during step 230. In some embodiments, after applying the heat to the floor heating system, the method 200 continues to an end step 235.

The method 200 may include one or more additional steps in some embodiments. For example, in some embodiments, the refrigeration system may include another heat exchanger (e.g., first heat exchanger 120) which is also configured to apply a cooling stage to the refrigerant circulating through the refrigeration system. As such, method 200 may include a step wherein a third cooling stage is applied by an additional heat exchanger, wherein the additional heat exchanger is located upstream from the gas cooler 130. Although this disclosure describes and depicts certain steps of method 200, this disclosure recognizes that method 200 may comprise any suitable step.

In addition to utilizing waste heat of a transcritical refrigeration system to heat the floor of an enclosed space, the present disclosure also contemplates other applications in which the waste heat can be utilized. As described above, this disclosure recognizes using waste heat of a transcritical refrigeration system to heat water or any other suitable substance. In many cases, facilities that have refrigeration systems also include water heating systems for heating tap water. As an example, a grocery store having refrigeration needs may also have a water heating system to supply hot water to a hot water tank. Such a facility is illustrated in FIG. 3. The refrigeration system depicted in FIG. 1 has been reproduced in FIG. 3 for simplicity. As described above in reference to FIG. 1, refrigeration system 100 of FIG. 3 may include one or more additional components that are not described or depicted in FIG. 3.

Refrigeration system 100 of FIG. 3 is operating in cooperation with water heating system 300. Water heating system 300 may include one or more components. As depicted in FIG. 3, water heating system 300 includes a water reservoir 305 and a hot water tank 310. In operation, water from reservoir 305 may be directed through second heat exchanger 140 for a first heating stage and may be directed through first heat exchanger 120 for a second heating stage. As explained above, second heat exchanger 140 may provide low-grade heat and first heat exchanger 120 may provide high-grade heat. As such, water passing through second heat exchanger 140 may be heated by low-grade heat and water passing through first heat exchanger 120 is heated by high-grade heat.

In some embodiments, water is warmed between 7-13° K during the first heating stage and between 20-30° C. during the second heating stage. As an example, second heat exchanger 140 may receive tap water having a temperature of 25° C. from water reservoir 305 and provide a first heating stage (using low-grade waste heat) to the received tap water before discharging the heated tap water to first heat exchanger 120. In such example, the temperature of the tap water discharged from second heat exchanger 120 may be 35° C. First heat exchanger 120 may receive the heated tap water from second heat exchanger 140 and apply a second heating stage (using high-grade waste heat) to the received tap water before discharging the heated tap water to hot water tank 310. The temperature of the tap water discharged from first heat exchanger 120 and stored in hot water tank 310 may be 60° C. In this manner, water heating system 300 may reclaim low and/or high-grade waste heat of heat exchangers 120 and 140 and reduce and/or remove operation of any heating element that would otherwise heat the tap water. Additionally, second heat exchanger 140 supplements cooling of the refrigerant circulating through refrigeration system 100 thereby reducing the power of compressor 110*b*.

Figure 4:
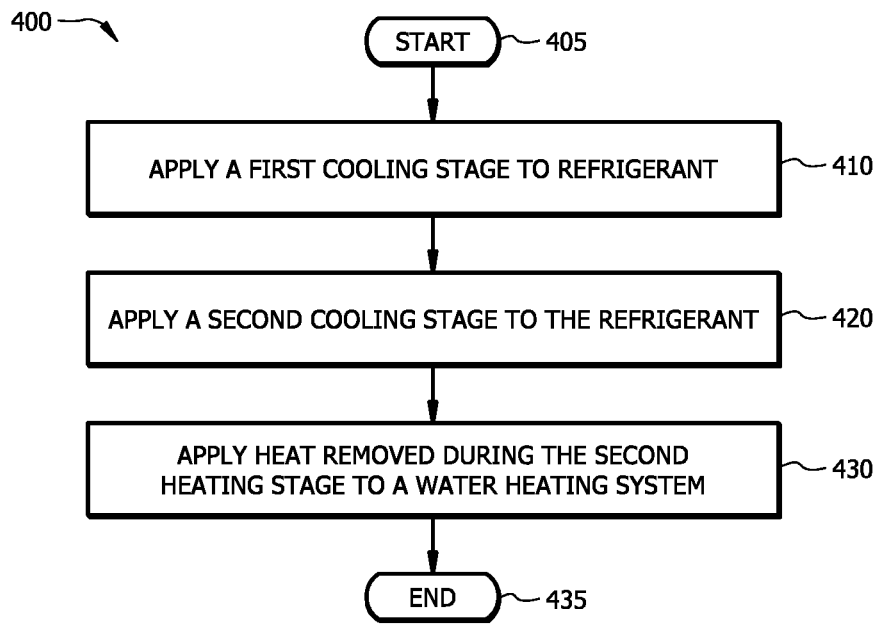
FIG. 4 is a flow chart illustrating a method of operation for the example refrigeration system of FIG. 3, according to certain embodiments of the present disclosure.

FIG. 4 illustrates a method of operation for the refrigeration system configuration of FIG. 3. In some embodiments, the method 400 may be implemented by a controller of refrigeration system 100 (e.g., controller 500 of FIG. 5). Method 400 may be stored on a computer readable medium, such as a memory of controller 500 (e.g., memory 520 of FIG. 5), as a series of operating instructions that direct the operation of a processor (e.g., processor 530 of FIG. 5). Method 400 may be associated with efficiency benefits such as reduced power consumption relative to refrigeration systems that do not operate a heat exchanger downstream from the gas cooler. In some embodiments, the method 400 begins in step 405 and continues to step 410.

At step 410, the refrigeration system applies a first cooling stage to refrigerant circulating through the refrigeration system. In some embodiments, the component that applies the first cooling stage is a gas cooler (e.g., gas cooler 130 of FIG. 3) of the refrigeration system. The refrigerant may be cooled between 70-90° C. during the first cooling stage. As an example, gas cooler 130 may receive refrigerant having a temperature of 120° C., apply the first cooling stage to the received refrigerant, and discharge the refrigerant at a temperature of 40° C. In some embodiments, gas cooler 130 receives the refrigerant from first heat exchanger 120. In some embodiments, gas cooler 130 discharges the refrigerant to second heat exchanger 140. After applying the first cooling stage to the refrigerant, the method 400 may continue to a step 420. At step 420, the refrigeration system applies a second cooling stage to refrigerant circulating through the refrigeration system. In some embodiments, the component that applies the second cooling stage is a heat exchanger (e.g., second heat exchanger 140 of FIG. 3) of the refrigeration system. In some embodiments, the heat exchanger that applies the second cooling stage is located downstream from the gas cooler (e.g., gas cooler 130) of the refrigeration system. In some embodiments, applying the second cooling stage comprises removing heat from the refrigerant. Stated differently, the second cooling stage may cause a reduction in the temperature of the refrigerant. In some embodiments, the refrigerant may be cooled between 2-10° C. during the second cooling stage. As an example, second heat exchanger 140 may receive refrigerant having a temperature of 38° C., apply the second cooling stage to the received refrigerant, and discharge the refrigerant at a temperature of 32° C. In some embodiments, second heat exchanger 140 receives the refrigerant from gas cooler 130. In some embodiments, second heat exchanger 140 discharges the refrigerant to expansion valve 150 to supply the refrigerant to a refrigeration load. After applying the second cooling stage to the refrigerant, the method 400 may continue to a step 430.

At step 430, the refrigeration system applies the heat removed during step 420 to a water heating system (e.g., water heating system 300 of FIG. 3). In some embodiments, the component of refrigeration system that applies the heat to the water heating system is a heat exchanger (e.g., second heat exchanger 140 of FIG. 3). In some embodiments, the heat exchanger that applies the heat removed during step 220 is located downstream from a gas cooler (e.g., gas cooler 130) of the refrigeration system. In some embodiments, the refrigeration system applies the heat to water circulating through the water heating system. The water heating system may, in some embodiments, comprise a water reservoir (e.g., water reservoir 305 of FIG. 3) and a hot water tank (e.g., hot water tank 310 of FIG. 3) and be operable to heat water from the water reservoir and deliver the heated water to the hot water tank. As an example, second heat exchanger 140 applies the heat removed from the refrigerant during step 220 to water directed to second heat exchanger 140 from water reservoir 305. Because heat is applied to the water during step 430, the action is alternatively referred to herein as a heating stage. Accordingly, applying the heat to the water preheats the water. In some embodiments, the water is pre-heated by at least 5° C. during step 430. In some embodiments, after applying the heat to the water heating system, the method 400 continues to an end step 435.

The method 400 may include one or more additional steps in some embodiments. For example, in some embodiments, the refrigeration system may include another heat exchanger (e.g., first heat exchanger 120 of FIG. 3) which is also configured to apply a cooling stage to the refrigerant circulating through the refrigeration system. As such, method 400 may include a step wherein a third cooling stage is applied by an additional heat exchanger, wherein the additional heat exchanger is located upstream from the gas cooler 130. As another example, the method 400 may include one or more step(s) wherein the additional heat exchanger (e.g., first heat exchanger 120 of FIG. 3) receives the preheated water discharged from the heat exchanger (e.g., second heat exchanger 140 of FIG. 3), applies a second heating stage to the received water, and discharges the heated water to the hot water tank (e.g., hot water tank 310 of FIG. 3). Although this disclosure describes and depicts certain steps of method 400, this disclosure recognizes that method 400 may comprise any suitable step.

Figure 5:
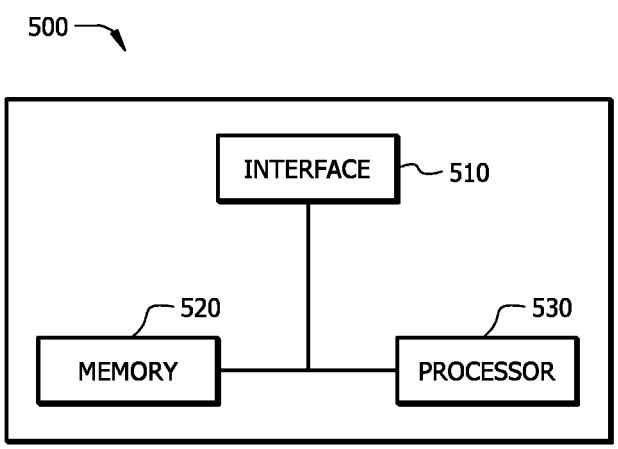
FIG. 5 illustrates an example of a controller of a refrigeration system, according to certain embodiments.

FIG. 5 illustrates an example controller 500 of refrigeration system 100, according to certain embodiments of the present disclosure. Controller 500 may comprise one or more interfaces 510, memory 520, and one or more processors 530. Interface 510 receives input (e.g., sensor data or system data), sends output (e.g., instructions), processes the input and/or output, and/or performs other suitable operation. Interface 510 may comprise hardware and/or software. As an example, interface 510 receives information (e.g., temperature and/or pressure information) about one or more components of refrigeration system 100 (e.g., via sensors).

Memory (or memory unit) 520 stores information. As an example, memory 520 may store methods 200 and 400. Memory 520 may comprise one or more non-transitory, tangible, computer-readable, and/or computer-executable storage media. Examples of memory 520 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Processor 530 may include any suitable combination of hardware and software implemented in one or more modules to execute instructions and manipulate data to perform some or all of the described functions of controller 500. In some embodiments, processor 530 may include, for example, one or more computers, one or more central processing units (CPUs), one or more microprocessors, one or more applications, one or more application specific integrated circuits (ASICs), one or more field programmable gate arrays (FPGAs), and/or other logic.

Embodiments of the present disclosure may have one or more technical advantages. In certain embodiments, a heat exchanger downstream the gas cooler provides supplemental cooling to refrigerant, thereby reducing the amount of power of other refrigeration system components configured to cool the refrigerant. Additionally, the waste heat produced by the downstream heat exchanger may be reclaimed by other facility systems (e.g., floor heating system, water heating system), thereby reducing the amount of power of compressors 110.

Including a heat exchanger downstream from the gas cooler as disclosed herein may provide efficiency benefits for both the transcritical refrigeration system and other facility systems as explained above. For example, assuming a transcritical refrigeration system having a 50 kW MT load, 20 kW LT load, a 0.4% dry bulb temperature of 35° C., a LT saturated suction temperature (SST) of −30° C., a MT SST of −6° C., a ground heating glycol temperature of 5° C. (50° F.), and a subcooler capacity of 5 kW, such transcritical refrigeration system could yield about 8% energy savings.

Although this disclosure describes and depicts a configuration of a transcritical refrigeration system including a heat exchanger downstream from the gas cooler, this disclosure recognizes other similar applications. For example, this disclosure recognizes a configuration of a conventional refrigeration system comprising a heat exchanger downstream from a condenser. The downstream heat exchanger would provide supplemental cooling to refrigerant circulating through the conventional refrigeration system, thereby reducing the power consumption of compressors 110. Additionally, the waste heat produced as a result of operation of the downstream heat exchanger could be reclaimed and used by other facility systems.

This disclosure also recognizes reclaiming waste heat of a gas cooler in a transcritical refrigeration system to replace and/or supplement heating in other facility systems. Taking FIG. 1 as an example, this disclosure recognizes that floor heating system 190 may reclaim waste heat of gas cooler 130. Taking FIG. 3 as an example, this disclosure recognizes that water heating system 300 may reclaim waste heat of gas cooler 130. In such embodiments, gas cooler 130 may receive and heat (using waste heat of gas cooler 130) a substance and/or solution (e.g., glycol solution, water) of another facility system (e.g., floor heating system, water heating system). Similarly, this disclosure recognizes reclaiming waste heat of a condenser in a conventional refrigeration system to replace and/or supplement heating in other facility systems. In such an embodiment, the condenser may receive and heat (using waste heat of the condenser) a substance and/or solution of another facility system. For example, waste heat of a condenser may be reclaimed by an air conditioning system of a facility.

Modifications, additions, or omissions may be made to the systems, apparatuses, and methods described herein without departing from the scope of the disclosure. The components of the systems and apparatuses may be integrated or separated. Moreover, the operations of the systems and apparatuses may be performed by more, fewer, or other components. For example, refrigeration system 100 may include any suitable number of compressors, condensers, condenser fans, evaporators, valves, sensors, controllers, and so on, as performance demands dictate. One skilled in the art will also understand that refrigeration system 100 can include other components that are not illustrated but are typically included with refrigeration systems. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A refrigeration system operable to circulate refrigerant through the refrigeration system in order to cool a refrigeration load, the refrigeration system comprising:
   a gas cooler operable to receive the refrigerant and apply a first cooling stage to the refrigerant;
   a first heat exchanger and a second heat exchanger, the first heat exchanger located downstream the gas cooler, the first heat exchanger operable to:
      receive the refrigerant cooled by the gas cooler;
      apply a second cooling stage to the refrigerant, the second cooling stage removing heat from the refrigerant;
      apply the heat removed during the second cooling stage to a water heating system operable to heat water, the water heating system comprising a water reservoir and a hot water tank and being operable to heat water from the water reservoir and deliver the heated water to the hot water tank; and
      discharge the refrigerant to an expansion valve operable to supply the refrigerant to the refrigeration load;
   wherein the gas cooler is further operable to:
      receive the water from the first heat exchanger; and
      heat the received water;
   wherein the second heat exchanger is located upstream of the gas cooler and operable to:
      receive the refrigerant;
      apply a third cooling stage to the refrigerant;
      receive the heated water from the gas cooler;
      apply a second heating stage to the heated water, thereby further heating the water; and
      discharge the further heated water to the hot water tank for storage in the hot water tank without first passing the water through the water reservoir.

2. The system of claim 1, wherein the first heat exchanger preheats water directed to the first heat exchanger from the water reservoir by applying the heat removed during the second cooling stage.

3. The system of claim 2, wherein the water is preheated at least 5° C.

4. The system of claim 1, wherein the refrigeration system is a transcritical refrigeration system and the refrigerant is a transcritical refrigerant.

5. The system of claim 1, wherein the second cooling stage cools the refrigerant at least 3° C.

6. A method of operating a refrigeration system, the method comprising:
   applying, by a gas cooler of the refrigeration system, a first cooling stage to refrigerant circulating through the refrigeration system load;
   applying, by a first heat exchanger located downstream from the gas cooler, a second cooling stage to the refrigerant, wherein the second cooling stage removes heat from the refrigerant;
   applying, by the first heat exchanger, the heat removed during the second cooling stage to a water heating system operable to heat water, the water heating system comprising a water reservoir and a hot water tank and being operable to heat water from the water reservoir and deliver the heated water to the hot water tank;
   pre-heating, by the first heat exchanger, water directed to the heat exchanger from the water reservoir during a first heating stage;
   receive, by the gas cooler, the preheated water from the first heat exchanger;
   heating, by the gas cooler, the received pre-heated water;

receiving, by a second heat exchanger located upstream of the gas cooler, the heated water from the gas cooler;

further heating, by the second heat exchanger, the heated water during a second heating stage; and discharging, by the second heat exchanger, the heated water to the hot water tank for storage in the hot water tank without first passing the water through the water reservoir.

7. The method of claim 6, wherein the first heat exchanger preheats water directed to the first heat exchanger from the water reservoir by applying the heat removed during the second cooling stage.

8. The method of claim 6, wherein the water is preheated at least 5° C.

9. The method of claim 6, further comprising:

applying, by the second heat exchanger, a third cooling stage to the refrigerant; and discharging the cooled refrigerant from the second heat exchanger to the gas cooler.

10. The method of claim 6, wherein the refrigeration system is a transcritical refrigeration system and the refrigerant is a transcritical refrigerant.

11. The method of claim 6, wherein the second cooling stage cools the refrigerant at least 3° C.

* * * * *